M. NESS.
STUMP PULLER.
APPLICATION FILED APR. 19, 1920.

1,366,885. Patented Jan. 25, 1921.

INVENTOR:
Martin Ness
BY
Pierre Garnier
ATTORNEY

UNITED STATES PATENT OFFICE.

MARTIN NESS, OF SEATTLE, WASHINGTON.

STUMP-PULLER.

1,366,885.  Specification of Letters Patent.  Patented Jan. 25, 1921.

Application filed April 19, 1920. Serial No. 374,809.

*To all whom it may concern:*

Be it known that I, MARTIN NESS, a citizen of the United States, residing at Seattle, in the county of King and State of Washington, have invented certain new and useful Improvements in Stump-Pullers, of which the following is a specification.

This invention relates to cable hauling machines; and its object is the provision of a powerful and efficient machine of this character which is peculiarly adapted for use as a stump-puller to clear land.

The invention consists in the novel construction, arrangement and combination of parts as will hereinafter be described with reference to the accompanying drawings and particularly set forth in the appended claims.

Figure 1:
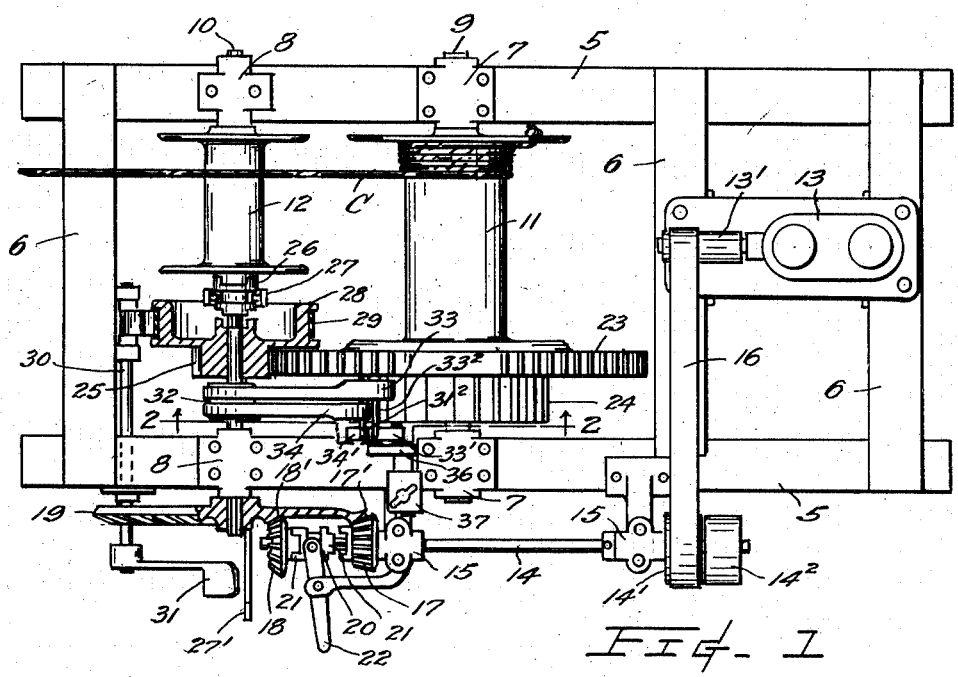
Figure 2:
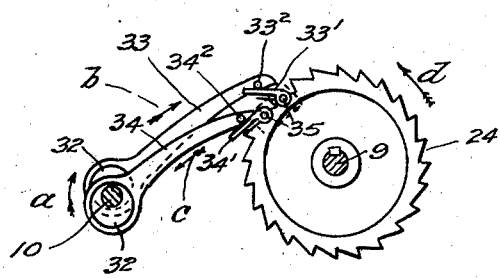
Figure 3:
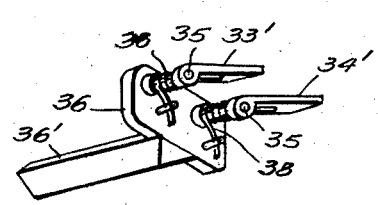

In said drawings, Figure 1 is a plan view, shown partly in horizontal section, of a machine embodying the present invention. Fig. 2 is a sectional view through 2—2 of Fig. 1, Fig. 3 is a perspective view of the controlling device for the winding drum actuating pawls.

In carrying out my invention I provide a rigid frame composed of longitudinal skid or runner members 5 and transverse beam members 6.

Secured to said frame are bearing boxes 7 and 8 for transversely arranged shafts 9 and 10 upon which are respectively mounted for independent rotary motion a cable winding-drum 11 and a cable haul-back drum 12.

Secured to the rear end of the frame is a motor 13 for driving a power shaft 14 which is journaled in boxes 15 secured to one side of said frame.

As shown, an endless belt 16 passing about pulleys $13^1$ and $14^1$ is utilized for transmitting motion from said motor to said power shaft. $14^2$ represents an idle pulley to receive the belt when starting. Mounted loosely upon the power shaft 14 are bevel-pinions 17 and 18 which are in continuous mesh with bevel gear teeth $17^1$ and $18^1$ of a wheel 19 which is secured to the adjacent end of the shaft 10. The gear teeth $17^1$ and $18^1$ are disposed in concentric series of different pitch diameters.

Splined to the shaft 14 between said pinions is a hub 20 having its ends formed to provide clutch elements 21 which are engageable with corresponding elements provided in the opposing ends of the pinions whereby either of the latter may be coupled with shaft 14 by suitably shifting the hub 20 as by means of a lever 22. Secured to or formed integral with the winding drum 11 are a spur gear 23 and a ratchet wheel 24. Said spur gear meshes with a spur pinion 25 which is rotatable upon shaft 10 and with which the pinion is coupled by a clutch member 26 splined to the shaft. The clutch member 26 is furthermore adapted to couple the haul-back drum 12 with shaft 10.

The said clutch member is shifted to engage in the clutch elements complementary thereto on either the pinion 25 or the drum 12 by means of the bifurcated arm 27 of a lever whose other arm $27^1$ extends to within convenient reach of the operator. Rigid with pinion 25 is a wheel 28 for a brake-band 29 which is actuated through the agency of a shaft 30 by means of a pedal 31.

The function of the above referred to brake is to check or arrest the rotation of the winding drum 11 and should be operated only when the pinion is in its released relations with respect to the shaft 10.

Provided on shaft 10 are eccentrics 32, or an equivalent, upon which are mounted pawls 33 and 34 of different lengths which are actuated by the respective eccentrics to alternately engage the successive teeth of the ratchet wheel 24 to impart intermittent rotary motion to the drum 11.

A purpose of the pawl-and-ratchet drive is to enable the drum 11 to be rotated at a slower speed than what is provided by the spur mechanism 25—23, as, for example when an exceptionally strong pull is to be applied to the cable C.

Another and important function of the pawls is to afford retrograde or reverse rotative motion to drum 11 to "ease off" the cable, so to speak, when under considerable tension and obviate any danger of straining or otherwise injuring the machine.

To which end I provide a pair of blades $33^1$ and $34^1$ pivotally connected by pins 35, see Figs. 2 and 3, to a bracket 36 having a shank $36^1$ extending through a guide 37 for movement into proximity with or away from said pawls.

Each of said blades is yieldingly held by a spring 38 in position to be encountered by studs $33^1$ and $34^1$ which protrude laterally from the respective pawls, when the bracket is brought into operative position in relation with the pawls and when the latter are brought into predetermined distances from the ultimate ends of their impelling strokes. The action of the pawls and associated blades in affording retroactive or unwinding rotation to the drum 11 will be understood from an inspection of Fig. 2 considered with the following explanation: Let arrow *a* denote direction of eccentrics with shaft 10 causing pawl 33 to advance as indicated by arrow *b* and pawl 34 to retract as indicated by arrow *c*. The spring of blade 33¹ acting through the medium of stud 33² causes the advancing pawl 33 to be held clear of the teeth until near the end of its impelling stroke whereupon a tooth is engaged and the wheel 24 together with the drum 11 is turned to a small extent in the direction opposite to that shown by arrow *d*. The retroaction of the wheel due to the strain of cable then retains the pawl 33 in engagement with the tooth above referred to and so continues until the pawl 33 almost reaches the end of its retracting stroke and the other pawl 34 has, in turn, engaged in its forward stroke a tooth and acted thereon in the manner explained above with respect to the pawl 34 at and following its engaging the tooth. When one pawl engages a tooth and causes the wheel 34 to be turned slightly ahead the other pawl is released and the power of the spring for the associated blade elevates the latter to withdraw the pawl from the orbit of travel of the wheel teeth. Hence the pawls when influenced by the spring pressed blades allow the drum 11 to rotate in a direction opposite to that in which they will cause the drum to rotate when the pawls are uninfluenced by the blades. When it is desired to employ the spur pinion 25 and gear 23 to drive the drum 11, the pawls 33 and 34 are both rendered inoperative by swinging the same to the side of the shaft 10 opposite to that in which they are illustrated in Figs 1 and 2.

The construction and operation of the invention will, it is thought, be understood from the foregoing description.

What I claim is—

1. In a cable hauling machine of the class described, the combination of a winding drum, a shaft therefor, a spur gear and a ratchet wheel mounted upon said shaft, a second shaft, a spur pinion on the second shaft and in continuous mesh with said gear, means to releasably engage said pinion to the second shaft, pawls actuated by the latter and engageable with said ratchet wheel, and means to rotate said second shaft to drive the drum through the medium of the spur gear or the pawls and ratchet wheel selectively.

2. In a cable hauling machine of the class described, the combination of a cable winding drum, a shaft therefor, a ratchet wheel mounted upon said shaft, a power driven shaft, eccentrics mounted upon the power shaft, pawls engageable with said ratchet wheel and actuated by the respective eccentrics to effect intermittent rotary motion in cable winding direction to the drum shaft, and means engageable with said pawls whereby the rotation of said eccentrics will afford intermittent rotary motion to the drum shaft to enable a cable to be unwound therefrom.

3. In a cable hauling machine, the combination of a motor, a shaft driven thereby, a cable winding drum, a shaft therefor, gear connections between said shafts for rotating the drum in a cable-winding direction, and successively acting means adapted to intermittently connect said shafts to enable a cable under tension to impart unwinding rotary motions to the drum.

4. In a cable hauling machine, a winding drum, a shaft therefor, a ratchet wheel mounted on said shaft, a second shaft, pawls engageable with said wheel and actuated by the rotation of the second named shaft for driving the drum shaft in one rotary direction, and pawl lifting means to permit motion in an opposite direction to the drum shaft.

5. In a cable hauling machine, a drum shaft, a ratchet wheel thereon, a power driven shaft, pawls actuated thereby to rotate said drum shaft intermittently through the instrumentality of said ratchet wheel, and spring pressed blade devices arranged to be brought into operative relations with the respective pawls whereby the latter serve to afford intermittent motion to the drum shaft in a rotary direction opposite to that in which the drum shaft is driven when said blade devices are unemployed.

Signed at Seattle, Washington, this 7th day of April, 1920.

MARTIN NESS.

Witnesses:
 PIERRE BARNES.
 IVA JEFFRIES.